US008934993B2

(12) United States Patent
Chang

(10) Patent No.: US 8,934,993 B2
(45) Date of Patent: Jan. 13, 2015

(54) LIFE MANAGEMENT CIRCUIT, AN ELECTRONIC SYSTEM AND A MACHINE-IMPLEMENTED METHOD FOR MANAGING USAGE RATES OF MULTIPLE ELECTRONIC COMPONENTS

(75) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 702 days.

(21) Appl. No.: 13/282,063

(22) Filed: Oct. 26, 2011

(65) Prior Publication Data

US 2012/0109339 A1    May 3, 2012

(30) Foreign Application Priority Data

Oct. 27, 2010  (TW) ................................ 99136744 A

(51) Int. Cl.
*G05B 11/01* (2006.01)
*G04F 1/00* (2006.01)
*G06F 15/173* (2006.01)
*G05B 15/02* (2006.01)

(52) U.S. Cl.
CPC ....................................... *G05B 15/02* (2013.01)
USPC ............................. 700/14; 702/176; 709/226

(58) Field of Classification Search
None
See application file for complete search history.

(56) References Cited

U.S. PATENT DOCUMENTS

| 2004/0163000 | A1 | 8/2004 | Kuhlmann et al. | |
| 2010/0005465 | A1* | 1/2010 | Kawato | 718/1 |
| 2011/0265090 | A1* | 10/2011 | Moyer et al. | 718/103 |

FOREIGN PATENT DOCUMENTS

| CN | 101477492 A | 7/2009 |
| CN | 101751014 A | 6/2010 |
| TW | 200502745 A | 2/1993 |

OTHER PUBLICATIONS

Chinese Office Action for corresponding patent application No. 201010526193.6 dated Mar. 19, 2013.
Office Action and translation for corresponding Taiwanese Application No. 099136744 dated Mar. 14, 2014.

(Continued)

*Primary Examiner* — Sean Shechtman
(74) *Attorney, Agent, or Firm* — Renner, Otto, Boisselle & Sklar, LLP

(57) ABSTRACT

A life management circuit for managing usage rates of a plurality of electronic components includes a storage unit for storing usage information corresponding to each electronic component, a receiving unit, a determining unit and a control unit. Upon receipt of an activation command passed on thereto via the receiving unit, the control unit selects for activation, with reference to the usage information of the electronic components stored in the storage unit, at least one electronic component, the usage information corresponding to which reveals a usage rate that is comparatively lower among the electronic components, controls the determining unit to keep track of the duration of time that the selected at least one electronic component remains activated in response to the activation command, and updates the usage information corresponding to each of the selected at least one electronic component with reference to the duration of time tracked therefor.

12 Claims, 4 Drawing Sheets

(56) References Cited

OTHER PUBLICATIONS

The Office Action issued to Taiwanese Counterpart Application No. 099136744 by the Taiwan Intellectual Property Office on Oct. 14, 2014, along with an English translation of the section boxed in red.
Wen-Hong Wang et al.; "Internet Networks Mainframe Room got fever; Two Air Conditioners to Automatically Shifts in Alternate Operations." the $42^{nd}$ Anniversary of National Primary and High School Science Fair (High School—Applied Science Group). Ministry of Education National Taiwan Science Education Center. 2002 http://activity.ntsec.gov.tw/activity/race-1/42/index.html?a=637. With English abstract. (referred to as Citation 2; Citation 1, namely TW 20050 2745 already of record.

* cited by examiner

US 8,934,993 B2

LIFE MANAGEMENT CIRCUIT, AN ELECTRONIC SYSTEM AND A MACHINE-IMPLEMENTED METHOD FOR MANAGING USAGE RATES OF MULTIPLE ELECTRONIC COMPONENTS

CROSS-REFERENCE TO RELATED APPLICATION

This application claims priority of Taiwanese Application No. 099136744, filed on Oct. 27, 2010.

BACKGROUND OF THE INVENTION

1. Field of the Invention

The invention relates to a life management circuit, more particularly to a life management circuit for managing the usage rates of a plurality of electronic components, an electronic system incorporating the same, and a machine-implemented method for managing the usage rates of a plurality of electronic components.

2. Description of the Related Art

As technology advances, light emitting diodes (LEDs) are more widely used in electronic equipments, such as in light indicators, illuminating devices, and as sources of backlighting in display screens.

Current illuminating devices generally utilize a light emitting module composed of multiple light emitting diodes to serve as the light source, and are normally enabled to operate under multiple modes (or provide multi-stage switching) such that the luminance intensity and the number of light emitting diodes lit up under each mode/stage are different to satisfy different needs. For instance, a night lamp mode might be used for reading at night, and a full bright mode might be used for other general purposes. However, some light emitting diodes in the same light emitting module might always be lit regardless of the mode of operation, such that these light emitting diodes have shorter lives, while the other light emitting diodes that are only lit in specific mode(s) have longer lives. Whenever a light emitting diode fails, the illuminating ability of the light emitting module as a whole is affected, and replacement of the whole light emitting module is generally required, even if other light emitting diodes are still functioning. This results in higher costs and waste of resources.

Similar issues are also encountered in other electrical or electronic equipments that use multiple electronic components or devices, such as air conditioner, motor, etc.

SUMMARY OF THE INVENTION

Therefore, an object of the present invention is to provide a life management circuit that can alleviate the aforesaid drawbacks of the prior art.

According to one aspect of the present invention, there is provided a life management circuit for managing usage rates of a plurality of electronic components. The life management circuit includes a storage unit, a receiving unit, a determining unit and a control unit. The storage unit is adapted for storing usage information corresponding to each of the electronic components. The receiving unit is adapted for receiving an activation command. The control unit is coupled electrically to the storage unit, the receiving unit and the determining unit, and is adapted to be coupled to the electronic components. Upon receipt of the activation command passed on thereto via the receiving unit, the control unit selects for activation, with reference to the usage information of the electronic components stored in the storage unit, at least one of the electronic components, the usage information corresponding to which reveals a usage rate that is comparatively lower among the plurality of electronic components, controls the determining unit to keep track of the duration of time that the selected at least one of the electronic components remains activated in response to the activation command, and updates the usage information corresponding to each of the selected at least one of the electronic components with reference to the duration of time tracked therefor. As such, the life management circuit prioritizes those electronic components with less usage rates for use (activation) in order to balance the usage rates of all of the electronic components to thereby prolong the lives of the electronic components as a whole.

The determining unit includes a timekeeper that keeps track of the duration of time that the selected at least one of the electronic components remains activated in response to the activation command. The usage information of each of the electronic components as stored in the storage unit corresponds to an accumulated time that the corresponding one of the electronic components has been activated, and the usage rate is lower when the accumulated time of the corresponding one of the electronic components is smaller. The control unit updates the usage information corresponding to each of the selected at least one of the electronic components by adding the duration of time tracked by the timekeeper to the usage information already stored in the storage unit.

Alternatively, the usage information of each of the electronic components as stored in the storage unit corresponds to a total amount of consumed electric energy that the corresponding one of the electronic components has consumed during activation, and the usage rate is lower when the total amount of consumed electric energy of the corresponding one of the electronic components is smaller. Accordingly, the determining unit may include a timekeeper and a power determining module that are coupled electrically to the control unit. The timekeeper keeps track of the duration of time that the selected at least one of the electronic components remains activated in response to the activation command. The power determining module determines a consumed electric power of each of the selected at least one of the electronic components when the selected at least one of the electronic components is activated in response to the activation command. The control unit updates the usage information corresponding to each of the selected at least one of the electronic components by adding a product of the duration of time tracked by the timekeeper and the consumed electric power determined by the power computing module for the corresponding one of the selected at least one of the electronic components to the usage information already stored in the storage unit.

The receiving unit is further adapted for receiving a termination command. Upon receipt of the termination command passed on thereto via the receiving unit, the control unit controls the selected at least one of the electronic components for deactivation, and updates the usage information corresponding to each of the selected at least one of the electronic components.

Another object of the present invention is to provide an electronic system that includes a plurality of electronic components, and the life management circuit described hereinabove.

A further object of the present invention is to provide a machine-implemented method for managing usage rates of a plurality of electronic components. The machine-implemented method includes the steps of:

(A) storing, with a processor, usage information corresponding to each of the electronic components in a storage unit;

(B) configuring the processor such that, upon receipt of an activation command, the processor selects for activation, with reference to the usage information of the electronic components, at least one of the electronic components, the usage information corresponding to which reveals a usage rate that is comparatively lower among the plurality of electronic components;

(C) configuring the processor to keep track of the duration of time that the selected at least one of the electronic components remains activated in response to the activation command; and (D) configuring the processor to update the usage information corresponding to each of the selected at least one of the electronic components with reference to the duration of time tracked therefor.

Step (D) cab be performed periodically while the selected at least one of the electronic components remains activated in response to the activation command.

Alternatively, the machine-implemented method further includes the step of (F) upon receipt of a termination command, configuring the processor to control the selected at least one of the electronic components for deactivation. Step (D) is performed upon receipt of the termination command by the processor.

The advantages and effects of the present invention lie in that the usage rates of the plurality of electronic components may be balanced, and the lives of the electronic components as a whole can be prolonged.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
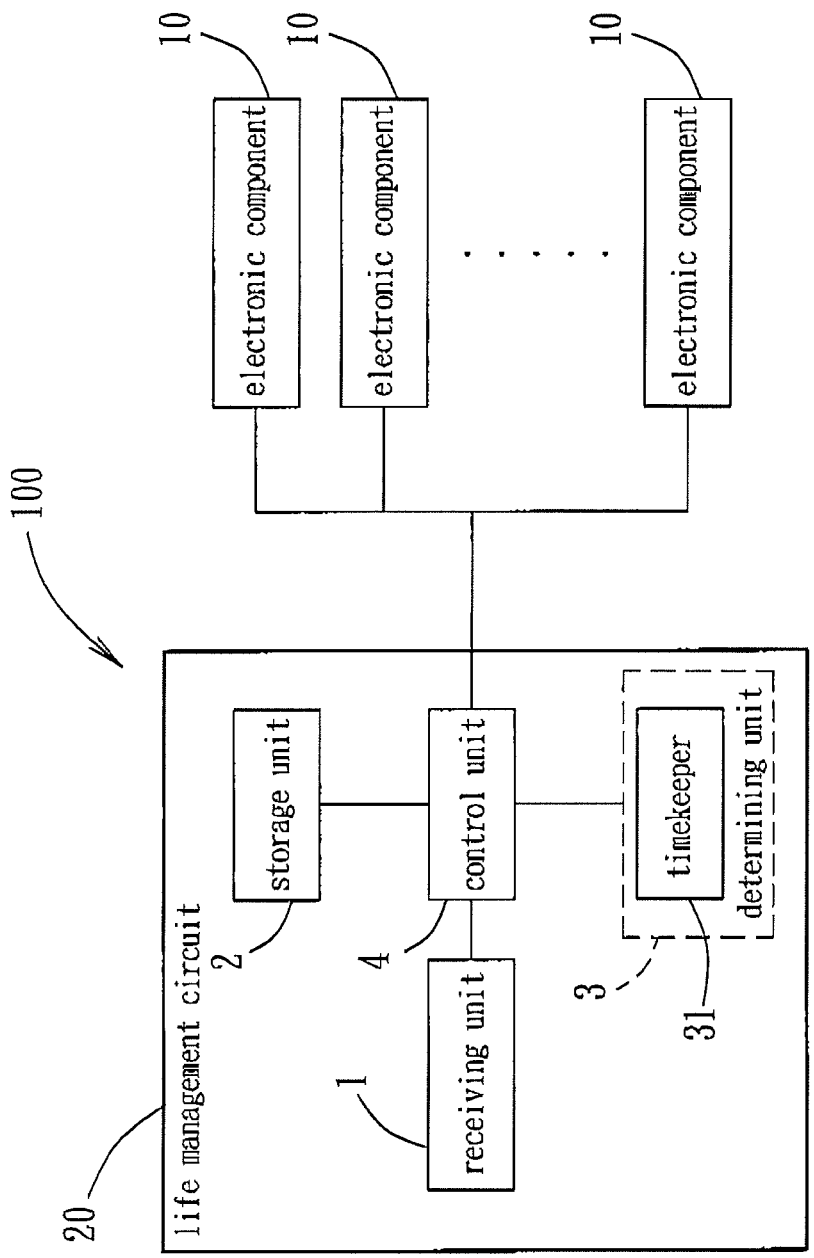
FIG. 1 is a block diagram of an electronic system with a life management circuit according to the first embodiment of the present invention.

Before the present invention is described in greater detail, it should be noted that like elements are denoted by the same reference numerals throughout the disclosure.

With reference to FIG. 1, an electronic system 100 according to the first embodiment of the present invention includes a plurality of electronic components 10, and a life management circuit 20 for managing usage rates of the electronic components 10. For illustration purposes, in this embodiment, each of the electronic components 10 is a light emitting diode or a light emitting element composed of multiple light emitting diodes, and the electronic components 10 are arranged to form a light emitting module that can be used as a light source for an illuminating lamp device, a light indicator or the like, or as backlight for a display screen. The life management circuit 20 includes a receiving unit 1, a storage unit 2, a determining unit 3 and a control unit 4.

The receiving unit 1 is a transmission interface that is adapted for receiving an activation command, which is generated as a result of user initiation or is generated by other system/devices. The storage unit 2 is a memory, e.g., an electrically erasable programmable read-only memory (EEPROM), a flash memory, etc., for storing usage information corresponding to each of the electronic components 10. In this embodiment, the usage information of each of the electronic components 10 as stored in the storage unit 2 corresponds to an accumulated time that the corresponding one of the electronic components 10 has been activated. The usage rate is lower when the accumulated time of the corresponding one of the electronic components 10 is smaller. Accordingly, the determining unit 3 includes a timekeeper 31. The control unit 4 is coupled electrically to the receiving unit 1, the storage unit 2, the determining unit 3, and the electronic components 10, and controls the usage rates of the electronic components 10 to be relatively leveled with respect to each other according to the usage information of the electronic components 10 as stored in the storage unit 2 in order to prolong the life of the light emitting module (which is composed of the plurality of electronic components 10) as a whole.

Figure 2:
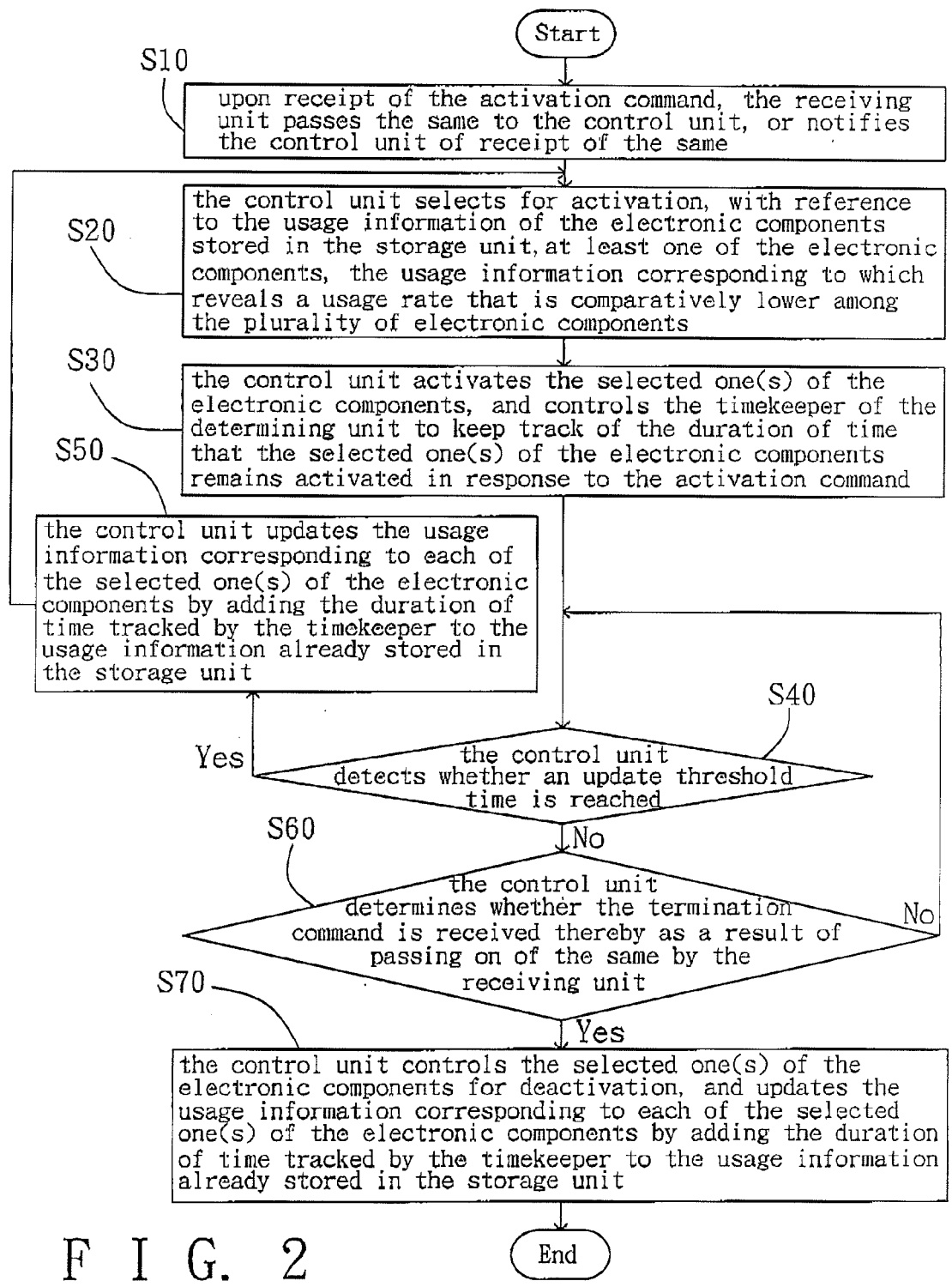
FIG. 2 is a flow chart of a machine-implemented method for managing usage rates of a plurality of electronic components according to the first embodiment.

With further reference to FIG. 2, the details of operation of the life management circuit 20 will be provided hereinunder. It should be noted herein that in the following example, the electronic components 10 are assumed to be in an off (deactivated) state at the beginning.

In step S10, upon receipt of the activation command, the receiving unit 1 passes the same to the control unit 4, or notifies the control unit 4 of receipt of the same. Then, the flow goes to step S20, where the control unit 4 selects for activation, with reference to the usage information of the electronic components 10 stored in the storage unit 1, at least one of the electronic components 10, the usage information corresponding to which reveals a usage rate that is comparatively lower among the plurality of electronic components 10. In this embodiment, the activation command is generated as a result of user actuation of a light control key (not shown), and may correspond to one of several modes, such as a night lamp mode, a full bright mode, etc. It should be noted herein that the activation command may also be generated by other devices or systems, and that the present invention should not be limited in this aspect.

The control unit 4 first determines the number of electronic components 10 that are required for the particular mode that corresponds to the activation command. For instance, it is assumed that the activation command corresponds to the night lamp mode, and that five electronic components 10 are required for the night lamp mode. Subsequently, the control unit 4 selects at least one (i.e., five in this example) of the electronic components 10 from among all of the electronic components 10 whose usage rate is comparatively lower than the rest of the electronic components 10 based on the usage information stored in the storage unit 2, so as to increase the usage rates of the selected one(s) of the electronic components 10 to be more in line with the usage rages of the rest of the electronic components 10 (i.e., the non-selected electronic components 10). In other words, the control unit 4 prioritizes those electronic components 10 that are less frequently used for selection when use of at least one of the electronic components 10 is requested (i.e., when the activation command is received), in order to balance out the usage rates of all of the electronic components 10 to thereby prolong the life of the light emitting module (which is composed of all of the electronic components 10) as a whole.

Moreover, in this embodiment, the way in which the control unit 4 makes the selection from among the electronic components 10 is to first arrange the electronic components 10 in order of their usage rates from low to high based on the usage information, and then to select the first one(s) of the electronic components 10 (the number of which depends on the mode corresponding to the activation command) in the arranged order. However, the control unit 4 may also make the selection by first randomly choosing the required number of electronic components 10 according to the activation command, followed by repeatedly comparing the usage information of the chosen electronic components 10 with those of the non-chosen electronic components 10 to determine if the chosen electronic components 10 are indeed less frequently used than the non-chosen ones, and swapping the chosen and non-chosen electronic components 10 if negative. It should be noted herein that the above and variations thereof should be readily appreciated by those skilled in the art, and that the present invention should not be limited in this aspect.

Subsequently, in step S30, the control unit 4 activates the selected one(s) of the electronic components 10, and controls the timekeeper 31 of the determining unit 3 to keep track of the duration of time that the selected one(s) of the electronic components 10 remains activated in response to the activation command. It should be noted herein that in this embodiment, the control unit 4 turns on the power for the selected one(s) of the electronic components 10 such that the selected one(s) of the electronic components 10 can be activated to start operating. The control unit 4 can be further coupled electrically to an electric current adjusting module (not shown) that adjusts the electric current passing through the selected one(s) of the electronic components 10 so as to adjust the brightness of the selected one(s) of the electronic components 10.

The control unit 4 further updates the usage information corresponding to each of the selected one(s) of the electronic components 10 with reference to the duration of time tracked therefor. In this embodiment, the control unit 4 updates the usage information corresponding to each of the selected one(s) of the electronic components 10 periodically while the selected one(s) of the electronic components 10 remains activated in response to the activation command. Therefore, in step S40, the control unit 4 detects whether an update threshold time (e.g., 30 minutes) is reached. If the update threshold time is reached, the flow goes to step S50, where the control unit 4 updates the usage information corresponding to each of the selected one(s) of the electronic components 10 by adding the duration of time tracked by the timekeeper 31 to the usage information already stored in the storage unit 2. The flow then goes back to step S20, where the control unit 4 re-selects for activation a number of electronic components 10 corresponding to that required by the activation command (five in this embodiment) based on the updated usage information stored in the storage unit 2. If the update threshold time is yet to be reached, the flow goes to step S60.

In this embodiment, the receiving unit 1 is further adapted for receiving a termination command. In step S60, the control unit 4 determines whether the termination command is received thereby as a result of passing on of the same by the receiving unit 1. In the affirmative, the flow goes to step S70, where the control unit 4 controls the selected one(s) of the electronic components 10 for deactivation, and updates the usage information corresponding to each of the selected one(s) of the electronic components 10 in the storage unit 2. In the negative, the flow goes back to step S40 to determine whether the update threshold time is reached.

It should be further noted herein that it is not required for the life management circuit 20 of the present invention to update the usage information periodically while the selected one(s) of the electronic components 10 remains activated in response to the activation command. The control unit 4 may also only update the usage information of each of the selected one(s) of the electronic components 10 upon receipt of the termination command. In this kind of implementation, steps S40 and S50 are omitted, and when the determination result of step S60 is negative, the control unit 4 allows the selected one(s) of the electronic components 10 to remain activated and controls the timekeeper 31 of the determining unit 3 to continue keeping track of the duration of time that the selected one(s) of the electronic components 10 remains activated in response to the activation command.

Moreover, the electronic components 10 of the present invention are not limited to the light emitting diode/module, but may also electric heaters, electric fans, air conditioners, motors, disk drives, servers, etc. in any kind of electric system. Taking the motor as an example, the life management circuit 20 of the present invention may select which one(s) of a plurality of motors is (are) to be turned on for a currently requested operation based on the usage rates of the motors as stored in the storage unit 2.

Figure 3:
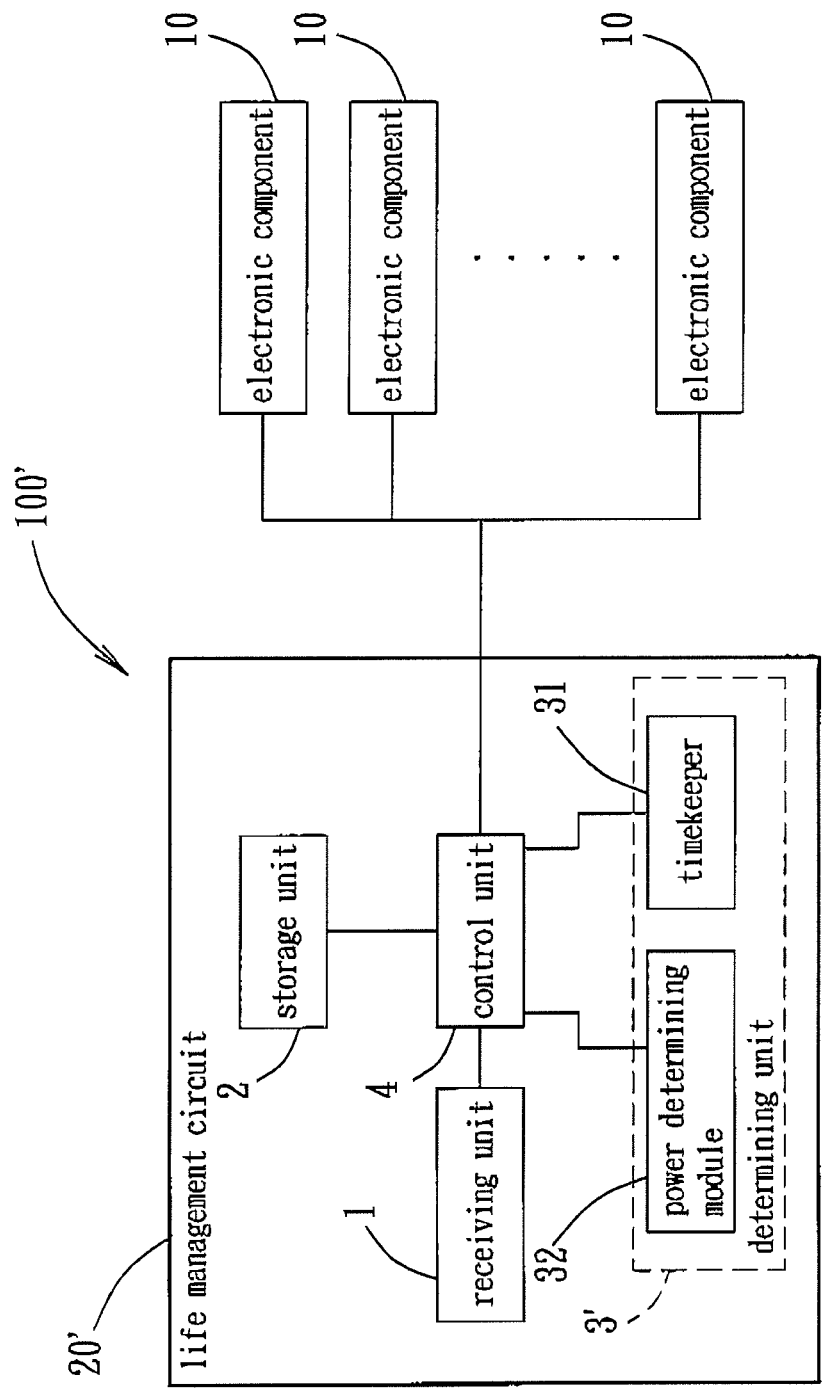
FIG. 3 is a block diagram of an electronic system with a life management circuit according to the second embodiment of the present invention.

With reference to FIG. 3, an electronic system 100' according to the second embodiment of the present invention differs from the electronic system 100 (as shown in FIG. 1) according to the first embodiment in that the usage information of each of the electronic components 10 as stored in the storage unit 2 of the life management circuit 20' of the second embodiment corresponds to a total amount of consumed electric energy that the corresponding one of the electronic components 10 has consumed during activation, and that the determining unit 3' includes a timekeeper 31 and a power determining module 32. The usage rate is lower when the total amount of consumed electric energy of the corresponding one of the electronic components 10 is smaller. The timekeeper 31 is coupled electrically to the control unit 4, and keeps track of the duration of time that the selected one(s) of the electronic components 10 remains activated in response to the activation command. The power determining module 32 is coupled electrically to the control unit 4, and determines a consumed electric power of each of the selected one(s) of the electronic components 10 when the selected one(s) of the electronic components 10 is activated in response to the activation command.

Figure 4:
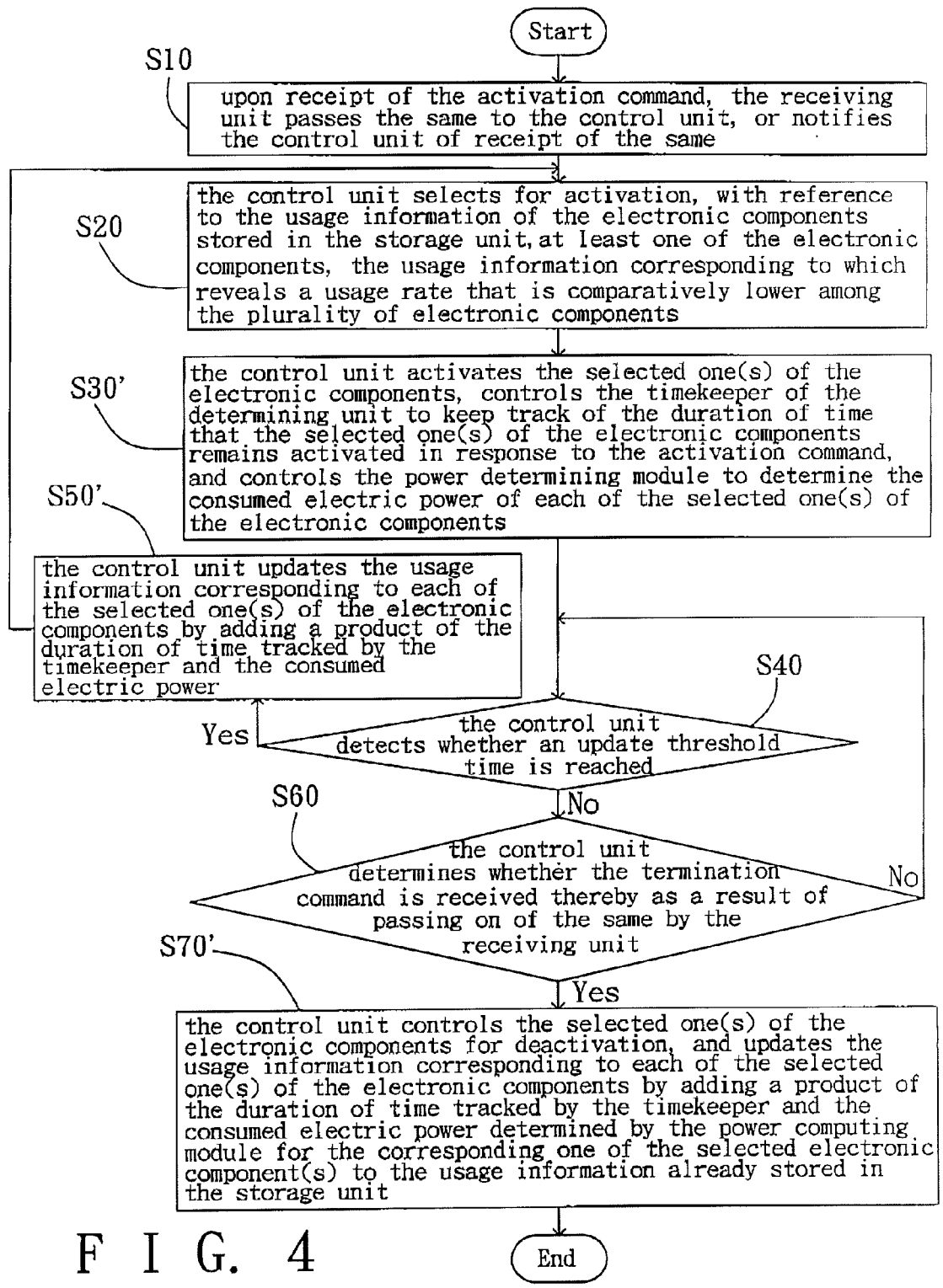
FIG. 4 is a flow chart of a machine-implemented method for managing usage rates of a plurality of electronic components according to the second embodiment.

Therefore, with further reference to FIG. 4, upon receipt of the activation command passed on thereto via the receiving unit 1, the control unit 4 selects for activation, with reference to the usage information of the electronic components 10 stored in the storage unit 2, at least one of the electronic components 10, the usage information corresponding to which reveals a usage rate that is comparatively lower among the plurality of electronic components 10 (step S20), and the number of electronic components 10 to be selected corresponds to the particular operating mode that corresponds to the received activation command. Then, in step S30', the control unit 4 activates the selected one(s) of the electronic components 10, controls the timekeeper 31 of the determining unit 3' to keep track of the duration of time that the selected one(s) of the electronic components 10 remains activated in response to the activation command, and also controls the power determining module 32 of the determining unit 3' to determine the consumed electric power of each of the selected one(s) of the electronic components 10. Subsequently, once the update threshold time is reached or once the termination command is received, the control unit 4 updates the usage information corresponding to each of the selected one(s) of the electronic components 10 by adding a product of the duration of time tracked by the timekeeper 31 and the consumed electric power determined by the power computing module 32 for the corresponding one of the selected electronic component(s) 10 to the usage information already stored in the storage unit 2 in step S50' or step S70'. In step S70', the control unit 4 also controls the selected one(s) of the electronic components 10 for deactivation.

It should be noted herein that the present invention also encompasses a machine-implemented method for managing usage rates of a plurality of electronic components 10 that involves the configuration of a processor (not shown) to execute the above-described steps S10 through to S70 (S70'). An additional step may be taken prior to step S10, where usage information corresponding to each of the electronic components 10 is stored in a storage unit with the processor.

In summary, the life management circuit 20, 20' according to the present invention utilizes the usage information stored in the storage unit 2 to determine which ones of a plurality of electronic components 10 have less usage rates for priority during use in order to balance the usage rates of all of the electronic components 10 to thereby prolong the lives of the electronic components 10 as a whole.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A life management circuit for managing usage rates of a plurality of electronic components, said life management circuit comprising:
    a storage unit adapted for storing usage information corresponding to each of the electronic components;
    a receiving unit adapted for receiving an activation command;
    a determining unit; and
    a control unit coupled electrically to said storage unit, said receiving unit and said determining unit, and adapted to be coupled to the electronic components;
    wherein, upon receipt of the activation command passed on thereto via said receiving unit, said control unit selects for activation, with reference to the usage information of the electronic components stored in said storage unit, at least one of the electronic components, the usage information corresponding to which reveals a usage rate that is comparatively lower among the plurality of electronic components, controls said determining unit to keep track of the duration of time that said selected at least one of the electronic components remains activated in response to the activation command, and updates the usage information corresponding to each of said selected at least one of the electronic components with reference to the duration of time tracked therefore;
    wherein the usage information of each of the electronic components as stored in said storage unit corresponds to a total amount of consumed electric energy that the corresponding one of the electronic components has consumed during activation, the usage rate being lower when the total amount of consumed electric energy of the corresponding one of the electronic components is smaller; wherein said determining unit includes a timekeeper that is coupled electrically to said control unit, and that keeps track of the duration of time that said selected at least one of the electronic components remains activated in response to the activation command, and a power determining module that is coupled electrically to said control unit, and that determines a consumed electric power of each of said selected at least one of the electronic components when said selected at least one of the electronic components is activated in response to the activation command; and wherein said control unit updates the usage information corresponding to each of said selected at least one of the electronic components by adding a product of the duration of time tracked by said timekeeper and the consumed electric power determined by said power computing module for the corresponding one of said selected at least one of the electronic components to the usage information already stored in said storage unit.

2. The life management circuit as claimed in claim 1, wherein the usage information of each of the electronic components as stored in said storage unit corresponds to an accumulated time that the corresponding one of the electronic components has been activated, the usage rate being lower when the accumulated time of the corresponding one of the electronic components is smaller, said determining unit including a timekeeper that keeps track of the duration of time that said selected at least one of the electronic components remains activated in response to the activation command, said control unit updating the usage information corresponding to each of said selected at least one of the electronic components by adding the duration of time tracked by said timekeeper to the usage information already stored in said storage unit.

3. The life management circuit as claimed in claim 1, wherein said receiving unit is further adapted for receiving a termination command, and
    upon receipt of the termination command passed on thereto via said receiving unit, said control unit controls said selected at least one of the electronic components for deactivation, and updates the usage information corresponding to each of said selected at least one of the electronic components.

4. The life management circuit as claimed in claim 1, wherein said control unit updates the usage information corresponding to each of said selected at least one of the electronic components periodically while said selected at least one of the electronic components remains activated in response to the activation command.

5. An electronic system comprising:
    a plurality of electronic components; and
    a life management circuit coupled to said electronic components, and including
        a storage unit for storing usage information corresponding to each of said electronic components,
        a receiving unit adapted for receiving an activation command,
        a determining unit, and
        a control unit coupled electrically to said storage unit, said receiving unit, said determining unit, and said electronic components,
    wherein, upon receipt of the activation command passed on thereto via said receiving unit, said control unit selects for activation, with reference to the usage information of said electronic components stored in said storage unit, at least one of said electronic components, the usage information corresponding to which reveals a usage rate that is comparatively lower among said plurality of electronic components, controls said determining unit to keep track of the duration of time that said selected at least one of said electronic components remains activated in response to the activation command, and updates the usage information corresponding to each of said selected at least one of said electronic components with reference to the duration of time tracked therefore; wherein the usage information of each of said electronic components as stored in said storage unit corresponds to a total amount of consumed electric energy that the corresponding one of said electronic components has consumed during activation, the usage rate being lower when the total amount of consumed electric energy of the corresponding one of said electronic components is smaller; wherein said determining unit includes a timekeeper that is coupled electrically to said control unit, and that keeps track of the duration of time that said selected at least one of said electronic components remains activated in response to the activation command, and a power determining module that is coupled electrically to said control unit, and that determines a consumed electric power of each of said selected at least one of said electronic components when said selected at least one of said electronic components is activated in response to the activation command; and wherein said control unit updates the usage information corresponding to each of said selected at least one of said electronic components by adding a product of the duration of time tracked by said timekeeper and the consumed electric power determined by said power computing module for the corresponding one of said selected at least one of said electronic components to the usage information already stored in said storage unit.

6. The electronic system as claimed in claim 5, wherein the usage information of each of said electronic components as stored in said storage unit corresponds to an accumulated time that the corresponding one of said electronic components has been activated, the usage rate being lower when the accumulated time of the corresponding one of said electronic components is smaller, said determining unit including a timekeeper that keeps track of the duration of time that said selected at least one of said electronic components remains activated in response to the activation command, said control unit updating the usage information corresponding to each of said selected at least one of said electronic components by adding the duration of time tracked by said timekeeper to the usage information already stored in said storage unit.

7. The electronic system as claimed in claim 5, wherein said receiving unit is further adapted for receiving a termination command, and
upon receipt of the termination command passed on thereto via said receiving unit, said control unit controls said selected at least one of said electronic components for deactivation, and updates the usage information corresponding to each of said selected at least one of said electronic components.

8. The electronic system as claimed in claim 5, wherein said control unit updates the usage information corresponding to each of said selected at least one of said electronic components periodically while said selected at least one of said electronic components remains activated in response to the activation command.

9. A machine-implemented method for managing usage rates of a plurality of electronic components, said method comprising the steps of:

(A) storing, with a processor, usage information corresponding to each of the electronic components in a storage unit;
(B) configuring the processor such that, upon receipt of an activation command, the processor selects for activation, with reference to the usage information of the electronic components, at least one of the electronic components, the usage information corresponding to which reveals a usage rate that is comparatively lower among the plurality of electronic components;
(C) configuring the processor to keep track of the duration of time that said selected at least one of the electronic components remains activated in response to the activation command; and
(D) configuring the processor to update the usage information corresponding to each of said selected at least one of the electronic components with reference to the duration of time tracked therefore;
wherein the usage information of each of the electronic components corresponds to a total amount of consumed electric energy that the corresponding one of the electronic components has consumed during activation, the usage rate being lower when the total amount of consumed electric energy of the corresponding one of the electronic components is smaller; said machine-implemented method further comprising the step of (E) configuring the processor to determine a consumed electric power of each of said selected at least one of the electronic components when said selected at least one of the electronic components is activated in response to the activation command; and wherein, in step (D), the usage information corresponding to each of said selected at least one of the electronic components is updated by adding a product of the duration of time tracked in step (C) and the consumed electric power determined for the corresponding one of said selected at least one of the electronic components in step (E) to the usage information already stored in the storage unit.

10. The machine-implemented method as claimed in claim 9, wherein the usage information of each of the electronic components corresponds to an accumulated time that the corresponding one of the electronic components has been activated, the usage rate being lower when the accumulated time of the corresponding one of the electronic components is smaller; and
wherein, in step (D), the usage information corresponding to each of said selected at least one of the electronic components is updated by adding the duration of time tracked in step (C) to the usage information already stored in the storage unit.

11. The machine-implemented method as claimed in claim 9, further comprising the step of (F) upon receipt of a termination command, configuring the processor to control said selected at least one of the electronic components for deactivation, wherein step (D) is performed upon receipt of the termination command by the processor.

12. The machine-implemented method as claimed in claim 9, wherein step (D) is performed periodically while said selected at least one of the electronic components remains activated in response to the activation command.

* * * * *